(12) United States Patent
Huang et al.

(10) Patent No.: US 12,548,613 B2
(45) Date of Patent: Feb. 10, 2026

(54) DELAY CONTROL CIRCUIT, DELAY CONTROL METHOD AND MEMORY

(71) Applicant: CHANGXIN MEMORY TECHNOLOGIES, INC., Hefei (CN)

(72) Inventors: Zequn Huang, Hefei (CN); Kai Sun, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 130 days.

(21) Appl. No.: 18/533,165

(22) Filed: Dec. 7, 2023

(65) Prior Publication Data

US 2024/0119988 A1    Apr. 11, 2024

Related U.S. Application Data

(63) Continuation of application No. PCT/CN2022/127069, filed on Oct. 24, 2022.

(30) Foreign Application Priority Data

Oct. 8, 2022    (CN) .......................... 202211222064.7

(51) Int. Cl.
G11C 16/04    (2006.01)
G11C 11/406    (2006.01)

(52) U.S. Cl.
CPC .............................. G11C 11/40615 (2013.01)

(58) Field of Classification Search
CPC .............................................. G11C 11/40615
See application file for complete search history.

(56) References Cited

U.S. PATENT DOCUMENTS

| | | | |
|---|---|---|---|
| 7,205,803 B2 * | 4/2007 | Chung | H03K 5/133 327/158 |
| 7,447,111 B2 | 11/2008 | Kim | |
| 10,275,386 B2 | 4/2019 | Dearth | |
| 11,221,913 B2 | 1/2022 | Rooney | |
| 2005/0128828 A1 * | 6/2005 | Lee | G11C 7/1072 365/194 |
| 2008/0100358 A1 | 5/2008 | Kim | |

(Continued)

FOREIGN PATENT DOCUMENTS

| CN | 106104698 A | 11/2016 |
|---|---|---|
| CN | 112382321 A | 2/2021 |

(Continued)

OTHER PUBLICATIONS

International Search Report in the international application No. PCT/CN2022/127069, mailed on May 19, 2023. 6 pages with English translation.

Primary Examiner — Pho M Luu
(74) Attorney, Agent, or Firm — Syncoda LLC; Feng Ma

(57) ABSTRACT

A delay control circuit includes a delay circuit. The delay circuit is configured to receive an initial command signal, and to perform a non-clock-triggered delay processing on the initial command signal to obtain a target command signal. The initial command signal is generated based on an ECS operation mode, a time interval between the target command signal and the initial command signal meets a preset timing condition, the initial command signal is used for performing a first operation and the target command signal is used for performing a second operation.

17 Claims, 9 Drawing Sheets

(56) References Cited

U.S. PATENT DOCUMENTS

2015/0286405 A1* 10/2015 Chang .................... G11C 16/00
                                                        711/103
2015/0378956 A1    12/2015  Dearth
2021/0286670 A1     9/2021  Rooney
2022/0129348 A1     4/2022  Rooney

FOREIGN PATENT DOCUMENTS

CN      112783686 A     5/2021
CN      113393890 A     9/2021

* cited by examiner

US 12,548,613 B2

DELAY CONTROL CIRCUIT, DELAY CONTROL METHOD AND MEMORY

CROSS-REFERENCE TO RELATED APPLICATIONS

This is a continuation of International Patent Application No. PCT/CN2022/127069 filed on Oct. 24, 2022, which claims priority to Chinese Patent Application No. 202211222064.7 filed on Oct. 8, 2022. The disclosures of the above-referenced applications are hereby incorporated by reference in their entirety.

BACKGROUND

With the continuous development of semiconductor technologies, higher and higher requirements are put forward for data transmission speed when manufacturing and using computers and other devices. In order to obtain faster data transmission speed, a series of devices such as memories which can transmit data at a Double Data Rate (DDR) came into being.

Taking a Dynamic Random Access Memory (DRAM) as an example, an Error Check and Scrub (ECS) mode allows DRAM to internally read and modify the detected error code words, and to write the corrected data back to memory array. In the process of performing an ECS operation, the DRAM needs different commands to implement different functions, and there is a timing requirement between different commands generated internally. However, the current technologies cannot guarantee that a time interval between different commands meets the timing requirement, which affects the performance of the memory.

SUMMARY

The present disclosure relates to the field of semiconductor technologies, and in particular to a delay control circuit, a delay control method and a memory.

Embodiments of the present disclosure provide a delay control circuit, a delay control method and a memory.

In a first aspect, an embodiment of the present disclosure provides a delay control circuit which includes a delay circuit.

The delay circuit is configured to receive an initial command signal, and to perform a non-clock-triggered delay processing on the initial command signal to obtain a target command signal. The initial command signal is generated based on an ECS operation mode, a time interval between the target command signal and the initial command signal meets a preset timing condition, the initial command signal is used for performing a first operation, and the target command signal is used for performing a second operation.

In a second aspect, an embodiment of the present disclosure provides another delay control circuit which includes a delay circuit. The delay circuit is configured to receive an initial command signal, and to perform a non-clock-triggered delay processing on the initial command signal to obtain a target command signal. A power supply terminal of the delay circuit is configured to receive a first voltage which is stable, a time interval between the target command signal and the initial command signal meets a preset timing condition, the initial command signal is used for performing a first operation, and the target command signal is used for performing a second operation.

In a third aspect, an embodiment of the present disclosure provide a delay control method which includes following operations.

An initial command signal is received.

A non-clock-triggered delay processing on the initial command signal is performed to obtain a target command signal. The initial command signal is generated based on an ECS operation mode, a time interval between the target command signal and the initial command signal meets a preset timing condition, the initial command signal is used for performing a first operation, and the target command signal is used for performing a second operation.

DETAILED DESCRIPTION

Figure 1:
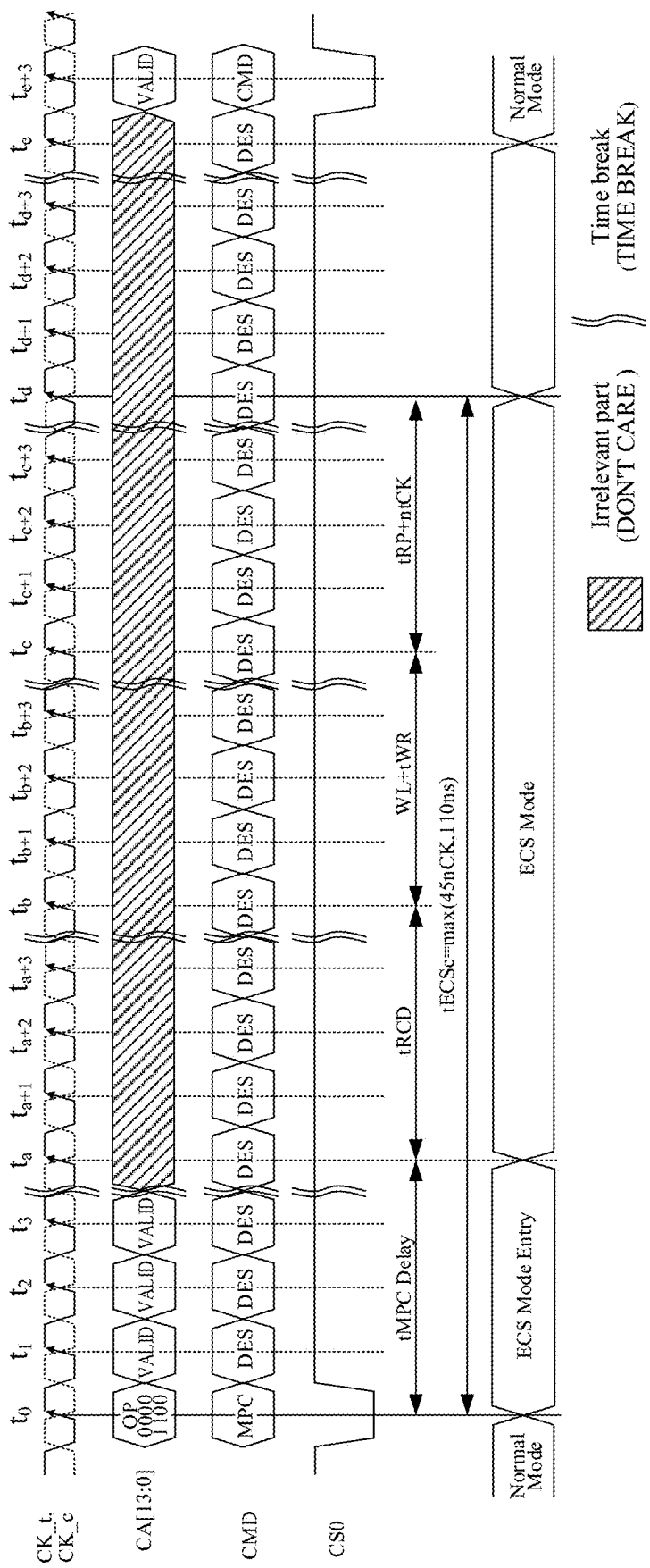
FIG. 1 is a schematic diagram of a timing relationship between command signals.

Hereinafter, the technical solution in the embodiments of the present disclosure will be clearly and completely described below in conjunction with the drawings in the embodiments of the present disclosure. It is to be understood that the detailed embodiments described herein are intended only to explain the relevant disclosure and not to limit the present disclosure. In addition, it should be noted that for convenience of description, only portions related to the relevant disclosure are shown in the drawings.

Unless otherwise defined, all technical and scientific terms used herein have the same meanings as those commonly understood by those skilled in the art of the present disclosure. The terms used herein are for the purpose of describing embodiments of the present disclosure only and are not intended to limit the present disclosure.

In the following description, the phrase "some embodiments" describes subsets of all possible embodiments, but it can be understood that the phrase "some embodiments" may refer to the same subset or different subsets of all possible embodiments and the phrase "some embodiments" may be combined with each other without conflict.

It should be noted that the term "first\second\third" referred to in the embodiments of the present disclosure is merely used to distinguish similar objects and does not represent a particular ordering of objects, and it can be understood that "first\second\third" may be interchanged in a particular order or a priority order where permissible to enable the embodiments of the present disclosure described herein to be implemented in an order other than that illustrated or described herein.

In a memory, such as a DRAM, there is usually a timing requirement between command signals. Taking performing an ECS operation as an example, in a process of performing the ECS operation, the DRAM needs different commands to realize different functions, and there is a timing requirement between different commands generated internally. FIG. 1 is a schematic diagram of a timing relationship between some command signals specified by the Joint Electron Device Engineering Council (JEDEC). As shown in FIG. 1, during performing an ECS operation, an order of command signals self-generated inside the DRAM is an active signal (ACT), a read operation signal or a read signal (RD) for short, a write operation signal or a write signal (WR) for short and a Precharge signal (PRE). tRCD represents a time interval (or "delay time" or "latency time") between the ACT and the RD, WL represents a time interval between the RD and the WR, and tWR represents a time interval between the WR and the PRE. Since all command signals are internally self-generated commands, the DRAM needs to internally control the timing from the ACT to the RD and the timing between other command signals. For example, the tRCD needs to meet 15 nanosecond (ns). However, because a register inside the DRAM does not record a value of the tRCD and so on, it is impossible to directly realize timing control from the ACT to the RD and timing control between other commands through clock shifting; especially during performing the ECS operation generated based on a Self_Refresh command signal (which is also called a self-refresh signal) is performed, because there is no external clock signal, the register cannot delay the command signals, so the timing requirement between the internally generated command signals cannot be met. In addition, due to different process, voltage and temperature (PVT) conditions, time delayed by a delay line needs to be greater than a time interval required by SPEC. If a specific delay time difference of the delay line is too large, it will affect the time required to complete the whole ECS cycle. Therefore, the great influence of the PVT is also a problem that needs to be solved.

Based on this, an embodiment of the present disclosure provides a delay control circuit, which performs a non-clock-triggered delay processing on an initial command signal through a delay circuit. In this way, even if there is no external clock signal as a clock for signal delay during performing an ECS operation, the initial command signal can be delayed for a certain time in a non-clock-triggered manner to obtain a target command signal, so as to make a time interval between the target command signal and the initial command signal meet a preset timing condition. In addition, a power supply terminal of the delay circuit can also be connected to a voltage generation circuit, the voltage generation circuit can provide the first voltage which is stable as a driving voltage for the delay circuit, thereby improving the problem that the time delayed by the delay circuit is affected by external factors such as PVT, and further improving the performance of the memory.

Embodiments of the present disclosure will be described in detail below with reference to the accompanying drawings.

Figure 2:
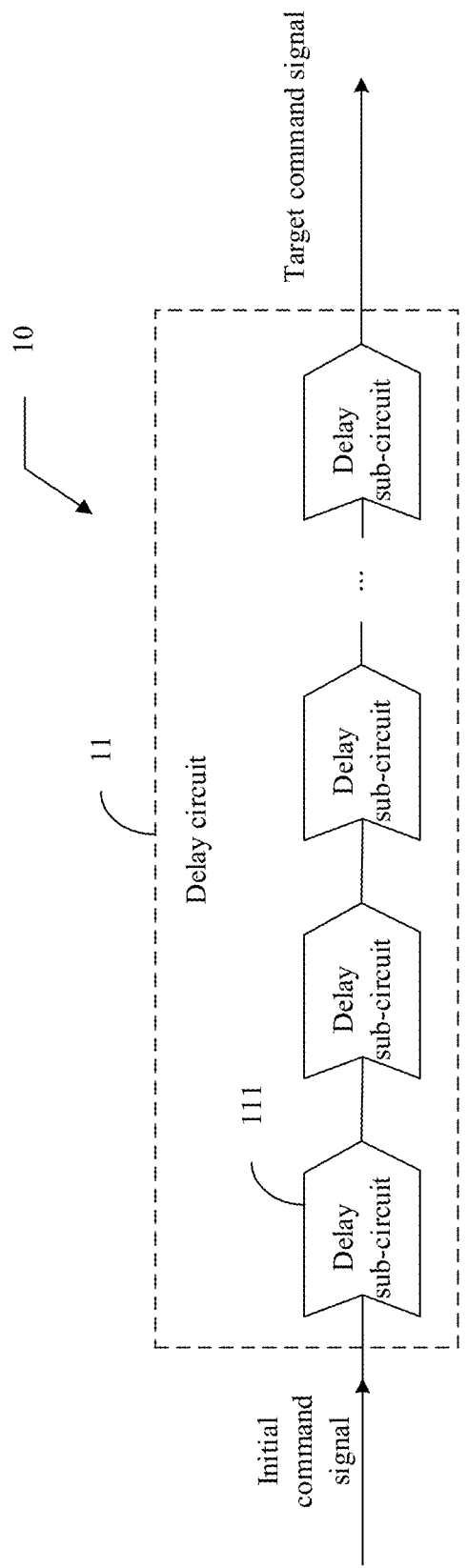
FIG. 2 is a schematic diagram of a composition structure of a delay control circuit according to an embodiment of the present disclosure.

In an embodiment of the present disclosure, referring to FIG. 2, a schematic diagram of a composition structure of a delay control circuit 10 according to an embodiment of the present disclosure is shown. As shown in FIG. 2, the delay control circuit 10 may include delay circuit 11.

The delay circuit 11 is configured to receive an initial command signal, and to perform the non-clock-triggered delay processing on the initial command signal to obtain a target command signal. The initial command signal is generated based on an ECS operation mode, a time interval between the target command signal and the initial command signal meets a preset timing condition, the initial command signal is used for performing a first operation, and the target command signal is used for performing a second operation.

It should be noted that in a semiconductor memory (e.g., DDR5), the ECS operation mode includes a manual ECS operation mode and an automatic ECS operation mode. A specific Multi-Purpose Command (MPC) signal can generate a manual ECS operation. A refresh command signal (Refresh, which can be abbreviated as REFab) and a self-refresh command signal (Self-Reresh, which can be abbreviated as Self_REF) can generate an automatic ECS operation.

During performing the ECS operation, the memory needs internal self-generated command signals to realize the ECS operation, and there is a timing requirement between these internal self-generated command signals. For the manual ECS operation, the register can use an external clock signal (CK_t) as a clock to delay and shift the command signals, so as to shift the command signals by a corresponding number of clock cycles to realize the delay requirement between the command signals. For example, the timing requirement from the ACT and the RD is the tRCD. However, when the automatic ECS operation generated based on Self_Refresh is performed, there is no external clock signal, and the register cannot delay the command signals to meet the timing requirement between the internal command signals.

To address this problem, according to the embodiments of the present disclosure, a delay circuit is choose and used to realize the delay requirement between internal command signals. As for the delay circuit, the delay processing performed by the delay circuit is non-clock-triggered. That is, the delay processing performed by the delay circuit is independent of the clock signal, so that when performing the delay processing on the command signal, the command signal can be delayed for a certain time without the external clock signal, which realizes the delay requirement for the command signal without the external clock signal. In addition, not only for the ECS operation mode without the external clock signal, but also for other non-clock-triggered operations without the external clock signal, the delay circuit can be used to realize the delay processing between the command signals.

In the embodiment of the present disclosure, the initial command signal is used to perform a first operation and the target command signal is used to perform a second operation, and the specific operation is related to the type of the command signal. During performing the ECS operation, the initial command signal may include an activate signal and the target command signal may include a read signal. Alternatively, the initial command signal may include a read signal and the target command signal may include a write signal. Alternatively, the initial command signal may include a write signal and the target command signal may include a precharge signal. The activate signal is used to perform the activate operation, the read signal is used to perform the read operation, the write signal is used to perform the write operation, and the precharge signal is used to perform the precharge operation. In addition, in other application scenarios, timing control between command signals generated inside the memory can also be realized by a delay control circuit 10, which is not specifically limited in the present disclosure.

It should also be noted that the delay circuit 11 can be specifically implemented by a delay line (which is also called a latency line), an oscillator, a register, or a capacitor and a transistor, etc. The delay line is described here as an example. That is, the delay circuit 11 may include a delay line. As shown in FIG. 2, the delay circuit 11 may include at least one delay sub-circuit 111. After the initial command signal is input into the delay circuit 11, the initial command signal is delayed by the delay sub-circuit 111 step by step, so as to delay the initial command signal for a time interval required by a preset timing condition and output the delayed initial command signal, and thus obtaining the target command signal.

It can be seen that, based on the delay control circuit 10 shown in FIG. 2, in the absence of an external clock signal, the delay processing on the initial command signal can be realized by the delay circuit 11, so that the time interval between the target command signal and the initial command signal meets a preset timing condition. The delay circuit 11 can be realized by the delay line. However, the general delay line is greatly affected by the PVT. Under different PVT conditions, the delay generated by the delay circuit needs to be greater than a time interval required by SPEC. If a difference of the delay times generated by the delay circuit is too large, it will affect the time required to complete the whole ECS operation cycle. Therefore, how to reduce the influence of PVT on the delay line is also a problem to be solved by the embodiment of the present disclosure.

Figure 3:
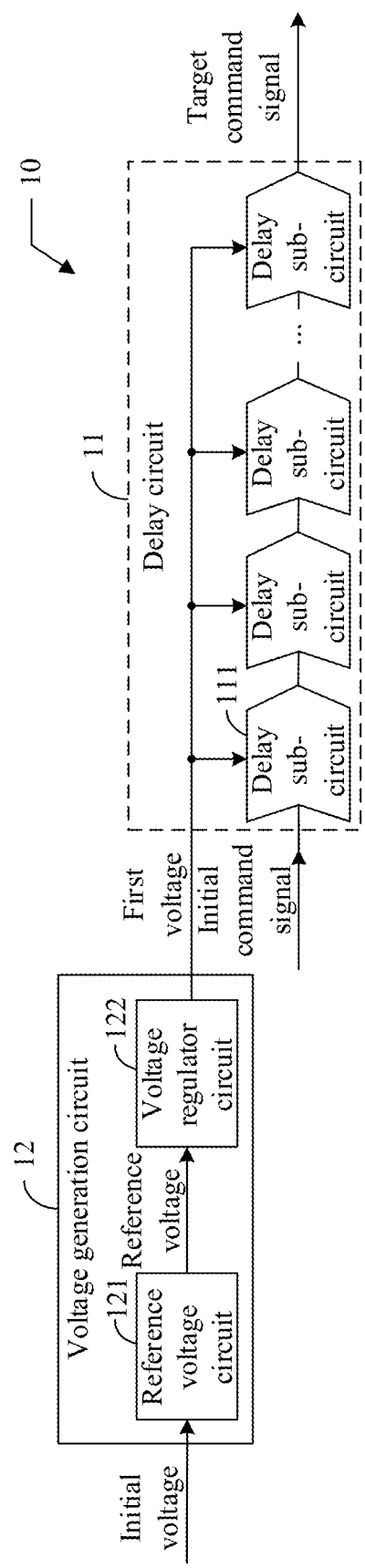
FIG. 3 is a schematic diagram of a composition structure of another delay control circuit according to an embodiment of the present disclosure.

In some embodiments, referring to FIG. 3, a schematic diagram of a composition structure of another delay control circuit 10 according to an embodiment of the present disclosure is shown. As shown in FIG. 3, the delay control circuit 10 may include a delay circuit 11.

The delay circuit 11 is configured to receive an initial command signal, and to perform a non-clock-triggered delay processing on the initial command signal to obtain a target command signal. A power supply terminal of the delay circuit 11 is used for receiving a first voltage which is stable, a time interval between the target command signal and the initial command signal meets a preset timing condition, the initial command signal is used for performing a first operation, and the target command signal is used for performing a second operation.

In order to solve the problem that the delay circuit is greatly affected by the PVT, in the embodiments of the present disclosure, the power supply terminal of the delay circuit 11 is connected to the first voltage which is stable.

For the first voltage, as shown in FIG. 3, in some embodiments, the delay control circuit 10 further includes a voltage generation circuit 12. The voltage generation circuit 12 is configured to generate the first voltage which is stable.

It should be noted that the delay circuit 11 is also connected to the voltage generation circuit 12, and the voltage generation circuit 12 can generate the first voltage which is stable, so that the delay circuit 11 is driven by the first voltage which is stable to perform a delay processing on the initial command signal. The first voltage may specifically refer to a delay circuit voltage VDLY (abbreviated as VDLY voltage). The VDLY voltage and the conventional operating voltage VDD (abbreviated as VDD voltage) are compared as follows. The VDD voltage is an external power supply and is provided to the whole DRAM circuit, and the driving currents are different due to different loads of different circuit modules. For example, in some circuits, a large load may be driven, resulting in a large current consumption. In this case, the level of the VDD voltage will drop, resulting in voltage fluctuation. The VDLY voltage is only used as the power supply of a small part of circuits, and the VDLY current consumed by the general circuits is within the current capacity of a VDLY power generator, and thus the level of VDLY voltage will not change greatly. Moreover, the VDLY voltage is not generated by an external power supply, but is generated by an internal circuit, which is specially used to drive a delay circuit and is not easily affected by other circuits and can maintain stability. However, when the VDD voltage is used to drive the delay circuit, the VDD voltage needs to drive other circuits, so the VDD voltage is more susceptible to influence, which leads to the delay instability of the delay line.

It should also be noted that, when the delay circuit 11 is a delay line, a power supply terminal of the delay line is connected to the voltage generation circuit 12, and the first voltage provided by the voltage generation circuit 12 drives the delay line. As shown in FIG. 3, the delay line includes at least one delay sub-circuit 111. A power supply terminal of each of the at least one delay sub-circuit 111 is used for receiving a first voltage.

It should be noted that the delay circuit 11 includes at least one delay sub-circuit 111, and the power supply terminal of the delay line includes the power supply terminal of each delay sub-circuit 111. That is, each delay sub-circuit 111 is driven by the first voltage which is stable. The initial command signal is transmitted to the delay circuit 11, and the initial command signal is delayed by the at least one delay sub-circuit 111 to obtain the target command signal and output the target command signal.

The delay sub-circuit 111 can delay the received signal for a certain duration and then output the delayed signal, and can realize the delay processing on the signal without an external clock signal. That is, the delay processing performed by the delay sub-circuit is independent of the clock. For example, the initial command signal is ACT (also denoted as ECS_ACT in the ECS operation), the target command signal is RD (also denoted as ECS_RD in the ECS operation), a preset timing condition requires a time interval of 15 ns between the RD and the ACT; and if one delay sub-circuit 111 can delay the signal for 1 ns, 15 delay sub-circuits 111 are connected in series, and the ACT is input into the first delay sub-circuit 111 and output by the last delay sub-circuit 111, thereby achieving a total delay of 15 ns. Finally, in the absence of the external clock signal, it is realized that the time interval between command signals meets the preset timing condition.

Alternatively, in the circuit design, delay times for signals delayed by different delay sub-circuits 111 may be different. For example, still taking the time interval between the target command signal and the initial command signal being 15 ns as an example, delay times of both the first delay sub-circuit 111 and the second delay sub-circuit 111 are 2 ns, delay times of both the third delay sub-circuit 111 and the fourth delay sub-circuit 111 are 3 ns, and delay time of the fifth delay sub-circuit 111 is 5 ns. The sum of the delay times of these five delay sub-circuits is 15 ns, and thus the time interval of 15 ns between the target command signal and the initial command signal can be realized.

Further, as mentioned above, the first voltage may be a delay circuit voltage (VDLY voltage), which is a stable operating voltage provided by the voltage generation circuit inside the memory. In the silicon wafer test process, the VDLY voltage is a voltage used for adjusting to stabilize the delay of the internal delay line, and the influence of voltage and process on the delay line can be reduced by using the VDLY voltage. The first voltage which is stable is input to the power supply terminal of each delay sub-circuit, and the delay sub-circuit is driven by the first voltage, so that the influence of external factors such as PVT on the delay of the delay line is reduced, thereby ensuring the time interval between the target command signal and the initial command signal to meet the preset timing condition.

For the voltage generation circuit, in some embodiments, as shown in FIG. 3, the voltage generation circuit 12 includes a reference voltage circuit 121 and a voltage regulator circuit 122.

The reference voltage circuit 121 is configured to receive an initial voltage and generate a reference voltage based on the initial voltage.

The voltage regulator circuit 122 is configured to perform a voltage regulator processing on the reference voltage to generate the first voltage which is stable.

It should be noted that, as shown in FIG. 3, an input terminal of the reference voltage circuit 121 is connected to the initial voltage, an output terminal of the reference voltage circuit 121 is connected to the voltage regulator circuit 122, and an output terminal of the voltage regulator circuit 122 is connected to the power supply terminal of each delay sub-circuit 111 to supply the first voltage to the delay sub-circuit 111.

As an example, the reference voltage circuit 121 may employ a bandgap voltage reference circuit that can generate a temperature-independent voltage. Simply put, the bandgap voltage reference circuit can generate a voltage with a positive temperature coefficient and a voltage with a negative temperature coefficient based on the initial voltage, superimpose the two voltages which are obtained by multiplying the voltage with the positive temperature coefficient by a corresponding proportional factor and multiplying the voltage with the negative temperature coefficient by a corresponding proportional factor, to obtain a temperature-independent reference voltage (which can be denoted as Vref). The initial voltage is an external voltage that may be provided by an external device or circuit. For example, the initial voltage is an external programming voltage VPPEX.

As an example, the voltage regulator circuit 122 may employ a low dropout regulator (LDO) that has extremely low self-generated noise and a high power supply rejection ratio, is capable of providing an accurate, stable, low ripple, low output noise DC voltage, and has very small input and output voltage drop. Thus, the voltage regulator circuit 122 performs a voltage regulator processing on a reference voltage to generate a first voltage (VDLY) which is stable and has the current capability, and the first voltage is a fixed voltage, which is not easily affected by external factors such as the PVT, and does not vary with the VDD.

Since a delay circuit inside the memory for delaying command signals (e.g., activate signal to read signal) uses a VDLY voltage as a driving voltage, the generated timing delays can also be used to correspondingly track the delay times between command signals.

Figure 4:
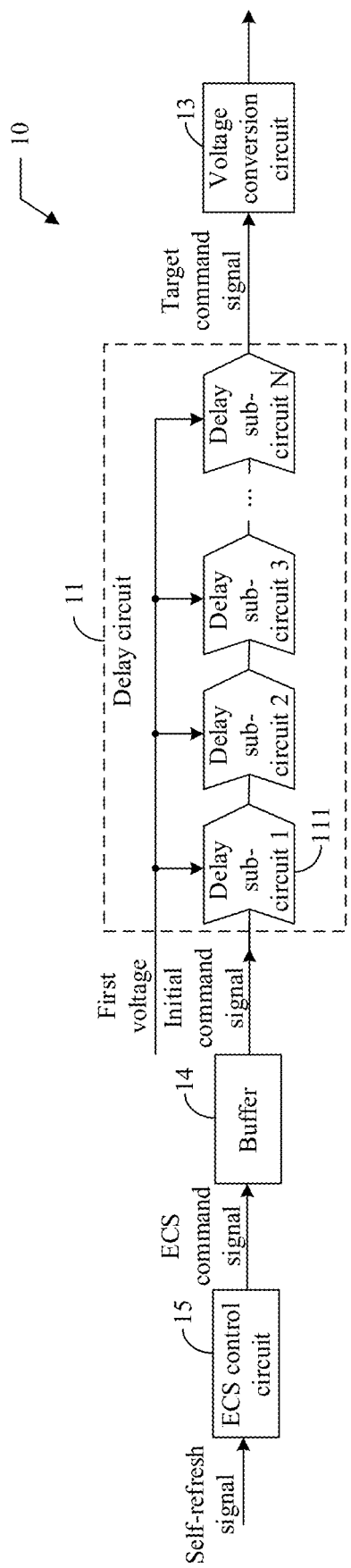
FIG. 4 is a schematic diagram of a composition structure of yet another delay control circuit according to an embodiment of the present disclosure.

Further, since logic timing of the internal command signals typically operates at the VDD voltage, a voltage conversion processing on the target command signal is further performed in the embodiments of the present disclosure. Referring to FIG. 4, a schematic diagram of a composition structure of yet another delay control circuit 10 according to an embodiment of the present disclosure is shown. As shown in FIG. 4, in some embodiments, the delay control circuit 10 further includes a voltage conversion circuit 13.

The voltage conversion circuit 13 is configured to perform a voltage conversion processing on the target command signal, to covert an operating voltage of the target command signal from the first voltage to a second voltage.

It should be noted that the second voltage is an operating voltage of the command signal in the DRAM under the normal operating state. Specifically, the second voltage can be the VDD voltage. In this way, the voltage conversion circuit 13 performs voltage conversion on the target command signal, to make a converted operating voltage of the target command signal be a VDD voltage, so that the corresponding operation can be normally performed in the DRAM.

That is to say, in order to make the operating voltage of the target command signal consistent with the operating voltage of other command signals in the DRAM, a voltage conversion circuit 13 (i.e., Level Shifter) is added after the delay circuit 11 in the embodiments of the present disclosure. The level shifter can realize the conversion from a lower voltage to a higher voltage and is a cell for realizing the conversion between different voltages. Generally speaking, a voltage value of the second voltage is greater than a voltage value of the first voltage, so that the voltage conversion circuit 13 converts the lower first voltage into the higher second voltage, thereby realizing the conversion of the operating voltage (or called Power Domain), i.e., converting the operating voltage of the target command signal from the VDLY voltage to the VDD voltage. That is, the voltage conversion circuit usually has the effect of enhancing the voltage. In this way, it is finally realized that the ECS_RD is self-generated inside the memory. Similarly, the timing from the RD to the WR and the timing from the WR to the PRE can also be realized in this way.

Further, as shown in FIG. 4, in the delay circuit 11, the number of at least one delay sub-circuit may be N, and the N is an integer greater than 0. In case that the N is equal to 1, an input terminal of the delay sub-circuit is configured to receive the initial command signal, and an output terminal of the delay sub-circuit is used for outputting the target command signal.

It should be noted that the N being equal to 1 means that the delay circuit 11 includes only one delay sub-circuit which receives the initial command signal, delays the initial command signal for a preset time interval, obtains the target command signal and outputs the target command signal.

It should also be noted that since a delay capability of one delay sub-circuit is limited, multiple delay sub-circuits are usually required to perform a delay processing. That is, N is usually greater than 1. As shown in FIG. 4, in case that the N is greater than 1, an input terminal of the first delay sub-circuit is configured to receive the initial command signal, an input terminal of an i-th delay sub-circuit is connected to an output terminal of an (i−1)-th delay sub-circuit, and an output terminal of an N-th delay sub-circuit is used for outputting the target command signal, and the i is an integer greater than 1 and less than or equal to the N.

As shown in FIG. 4, in case that the N is greater than 1, the delay circuit includes multiple delay sub-circuits 111, and the multiple delay sub-circuits are connected in series. The first delay sub-circuit to the N-th delay sub-circuit are sequentially denoted as a delay sub-circuit 1, a delay sub-circuit 2, a delay sub-circuit 3, . . . , a delay sub-circuit N, and a power supply terminal of each delay sub-circuit is connected to the voltage generation circuit (not shown in FIG. 4). An input terminal of the delay sub-circuit 1 is used for receiving the initial command signal, an output terminal of each of the first delay sub-circuit to the (N−1)-th delay sub-circuit is connected to an input terminal of a subsequent delay sub-circuit, and an output terminal of the N-th delay sub-circuit outputs the target command signal.

It should also be noted that, the delay sub-circuit is configured to delay the received input signal for a first duration and then output the delayed signal. A product value of the number of at least one delay sub-circuit and the first duration is equal to the time interval between the target command signal and the initial command signal.

It should be noted that, in the embodiments of the present disclosure, each delay sub-circuit can have the same specifications, and the delay time of each delay sub-circuit on the signal is recorded as the first duration (t1), the number of the at least one delay sub-circuit is recorded as n, and a time interval required by the preset timing condition is recorded as m, then: m=t1×n. In this way, a delay command signal is realized by the delay sub-circuits in the delay line, which is relatively more flexible. On the premise that a delay duration of a delay sub-circuit is known to be t1, the delay time m requires m/t1 delay sub-circuits.

It should also be noted that the delay duration of each delay sub-circuit in the delay line should not be too long, otherwise the transmission waveform will be affected. Therefore, it is also possible to set a delay threshold which indicates an upper limit value of the delay duration of each delay sub-circuit. That is, the first duration is less than or equal to the delay threshold, thereby ensuring that the transmission waveform is not affected.

Further, in the embodiments of the present disclosure, the number of delay sub-circuits can also be selected based on a time interval required by a preset timing condition, and the number of delay sub-circuits required by different time intervals is also different. In an implementation, the delay circuit is further configured to receive the first selection signal, and select the i-th delay sub-circuit to the N-th delay sub-circuit to delay the initial command signal based on the first selection signal, and the first selection signal has a corresponding relationship with the delayed time interval.

It should be noted that in this implementation, the initial command signal is connected to each delay sub-circuit, assuming that the N is equal to 20, that is, the delay circuit includes 20 delay sub-circuits, delay time of each delay sub-circuit is 1 ns, and the delay time interval required by the preset timing condition is 15 ns. In this case, the 6th delay sub-circuit to the 20th delay sub-circuit are selected based on the first selection signal, the 6th delay sub-circuit receives the initial command signal, the delay sub-circuits other than the 6th delay sub-circuit do not receive the initial command signal, and after the delay processing of the 6th delay sub-circuit to the 20th delay sub-circuit, the 20th delay sub-circuit outputs the target command signal. In addition, the numbers exemplified herein are only exemplary and are specifically determined in connection with the actual situation, which is not limited in the present disclosure.

In another implementation, the delay circuit is further configured to receive the second selection signal; and select, based on the second selection signal, the first delay sub-circuit to the i-th delay sub-circuit to delay the initial command signal, and the second selection signal has a corresponding relationship with the delay time interval.

It should be noted that in this implementation, the initial command signal is connected to the first delay sub-circuit. Assuming that the N is equal to 20, that is, the delay circuit includes 20 selection cells, the delay time of each delay sub-circuit is 1 ns, and the delay time interval required by the preset timing condition is 15 ns. In this case, the 1st delay sub-circuit to the 15th delay sub-circuit are selected based on the second selection signal, and the 1st delay sub-circuit receives the initial command signal. After the delay processing performed by the 1st delay sub-circuit to the 15th delay sub-circuit, the 15th delay sub-circuit outputs the target command signal, and the 16th delay sub-circuit to the 20th delay sub-circuit do not operate. In addition, the numbers exemplified herein are only exemplary and are specifically determined in connection with the actual situation, which is not limited in the present disclosure.

It should also be noted that, for the above two implementations, the selection of the delay sub-circuits may be realized by providing a selection module (not shown in the figure) before the delay sub-circuits, and the selection module determines, based on the selection signal (the first selection signal or the second selection signal), whether the delay sub-circuit connected to the selection module operates and/or whether the delay sub-circuit connected to the selection module receives the initial command signal or whether the delay sub-circuit connected to the selection module outputs the target command signal.

Figure 5:
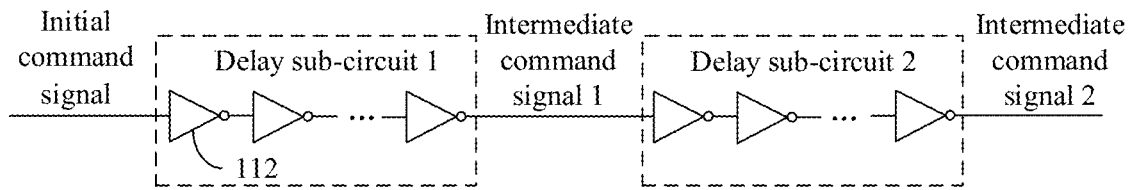
FIG. 5 is a schematic diagram of a specific structure of delay sub-circuits according to an embodiment of the present disclosure.

For the specific implementation of the delay sub-circuit, in a possible implementation, referring to FIG. 5, a schematic diagram of a specific structure of delay sub-circuits according to an embodiment of the present disclosure is shown. As shown in FIG. 5, the delay sub-circuit includes M inverters 112, and the M is an integer greater than 0.

A power supply terminal of each of the M inverters is connected to the voltage generation circuit.

In case that the M is equal to 1, an input terminal of the inverter 112 is used for receiving an input signal of the delay sub-circuit, and an output terminal of the inverter 112 is used for outputting an output signal of the delay sub-circuit.

In case that the M is greater than 1, an input terminal of the first inverter 112 is used for receiving the input signal of the delay sub-circuit, an input terminal of the j-th inverter 112 is connected to an output terminal of the (j−1)-th inverter 112, and an output terminal of the M-th inverter 112 is used for outputting the output signal of the delay sub-circuit, and the j is an integer greater than 1 and less than or equal to the M.

It should be noted that each delay sub-circuit may consist of M inverters 112 as shown in FIG. 5. FIG. 5 shows a delay sub-circuit 1 and a delay sub-circuit 2. In case that the M is equal to 1, that is, a delay sub-circuit includes only one inverter, then an input terminal of the inverter is an input terminal of the delay sub-circuit for receiving the input signal input to the delay sub-circuit, and an output terminal of the inverter is an output terminal of the delay sub-circuit for outputting the output signal after the delay processing.

In case that the M is greater than 1, the M inverters in the delay sub-circuit are connected together in series, and output signals of the delay sub-circuit 1 to the delay sub-circuit N−1 are sequentially denoted as an intermediate command signal 1, an intermediate command signal 2, . . . and an intermediate command signal N−1, and an output signal of a delay sub-circuit N is a target command signal. An input terminal of the first inverter 112 in the delay sub-circuit 1 receives an initial command signal, delays the initial command signal and transmits the delayed initial command signal to the subsequent inverter 112 until an output terminal of the M-th inverter 112 in the delay sub-circuit 1 outputs the intermediate command signal 1, and the intermediate command signal 1 is sequentially delayed until an output terminal of the last inverter 112 in the delay sub-circuit N outputs a target command signal.

Figure 6:
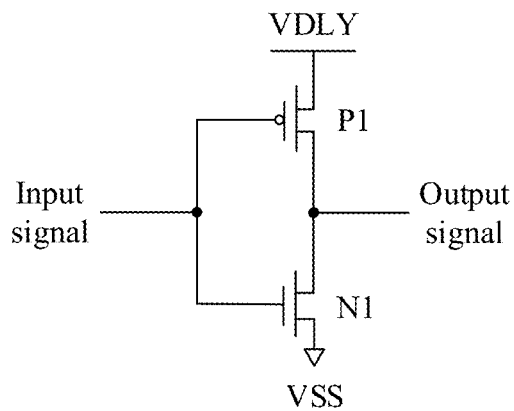
FIG. 6 is a schematic diagram of a circuit structure of an inverter according to an embodiment of the present disclosure.

It should also be noted that, a power supply terminal of each of the inverters 112 is connected to a voltage generation circuit (denoted as VDLY in the drawing), and the voltage generation circuit is capable of providing the first voltage which is stable. FIG. 6 is a schematic diagram of a circuit structure of an inverter according to an embodiment of the present disclosure. As shown in FIG. 6, each inverter consists of a Positive channel Metal Oxide Semiconductor field effect transistor (PMOS transistor) (denoted as P1) and a Negative channel Metal Oxide Semiconductor field effect transistor (NMOS transistor) (denoted as N1). Gates of the P1 and the N1 are connected for receiving the input signal of the inverter. A source of the P1 serves as a power supply terminal of the inverter, and is connected to the voltage generation circuit. A source of N1 serves as a grounding terminal of the inverter and is connected to a grounding voltage VSS. Drains of the P1 and the N1 are connected for outputting an output signal of the inverter.

In this way, after the initial command signal is transmitted into the delay circuit, the target command signal is finally obtained by performing the delay processing through multiple inverters. Because the power supply terminal of the inverter is connected to a voltage generation circuit, and the voltage generation circuit provides the first voltage which is stable to drive the inverter, the delay effect of the inverter is not easily affected by external factors such as PVT, etc., and the stable delay effect for the input signal is always maintained, which improves the delay performance of the circuit.

In addition, if level states of the target command signal and the initial command signal are required to be consistent, the total number of inverters in the delay circuit is an even number; and if the level states of the target command signal and the initial command signal are required to be opposite, the total number of inverters in the delay circuit is an odd number.

In another possible implementation, the i-th delay sub-circuit includes an inverter and L load capacitors, and the L is an integer greater than 0, in which:
an input terminal of the inverter is used for receiving an input signal;
an output terminal of the inverter is connected to the L load capacitors, a power supply terminal of each of the L load capacitors is connected to the voltage generation circuit, and a grounding terminal of each of the L load capacitors is connected to ground;
in case that the i is equal to 1, the input signal is the initial command signal; and in case that the i is greater than 1 and less than or equal to N, the input signal is the output signal of the (i−1)-th delay sub-circuit.

It should be noted that, according to the embodiments of the present disclosure, the delay processing on the command signal can also be realized through the inverter and the load capacitor. For the load capacitor, before a level value of the output terminal drops, the load capacitor needs to be discharged; and before the level value of the output terminal rises, the load capacitor needs to be charged, so as to realize the delay transmission of the command signal.

In each delay sub-circuit, the input terminal of the inverter is used as the input terminal of the delay sub-circuit for receiving the input signal input into the delay sub-circuit. For the first delay sub-circuit, the input signal is the initial command signal, and for the second delay sub-circuit to the N-th delay sub-circuit, the input signal is the output signal of the previous delay sub-circuit. Then, the delay processing is further performed by the L load capacitors on the signal output by the inverter, and finally the output signal of the delay sub-circuit is output. For the N-th delay sub-circuit, an output signal of the L load capacitors is the target command signal.

Since the power supply terminal of each load capacitor is connected to the voltage generation circuit and the grounding terminal of each load capacitor is connected to the VSS, the voltage generation circuit can provide the first voltage which is stable, thereby ensuring that the delay effect for the load capacitor is not easily affected by external factors, such as PVT and the like, and maintaining a stable delay time. In addition, the power supply terminal(s) of the inverter(s) in the delay sub-circuit can also be connected to the VDLY voltage, and the grounding terminal of the inverter in the delay sub-circuit is connected to the VSS, so as to maintain a stable delay effect.

Figure 7:
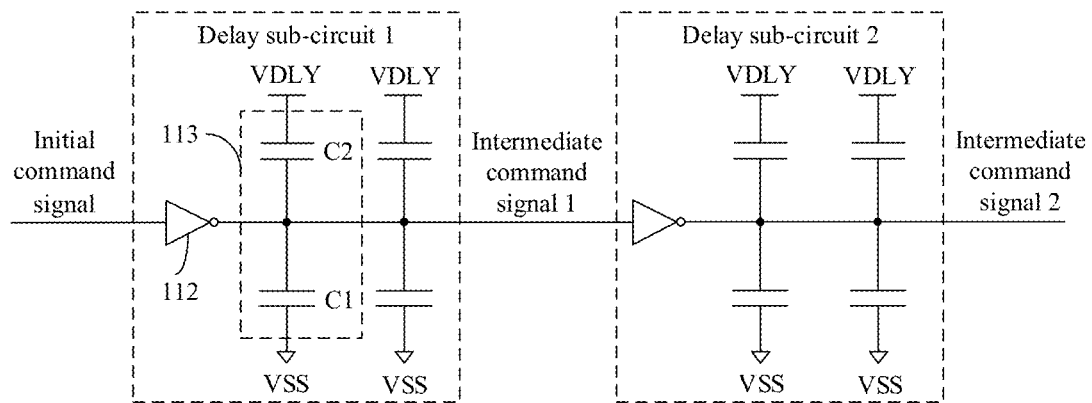
FIG. 7 is a schematic diagram of a specific structure of another delay sub-circuit according to an embodiment of the present disclosure.

It should also be noted that the load capacitor can be specifically realized by two capacitors. Referring to FIG. 7, a schematic diagram of a specific structure of another delay sub-circuit according to an embodiment of the present disclosure is shown. As shown in FIG. 7, the i-th delay sub-circuit includes an inverter 112 and L load capacitors 113, and the L is an integer greater than 0, in which:
an input terminal of the inverter 112 is used for receiving an input signal;
an output terminal of the inverter 112 is connected to the L load capacitors 113, and a power supply terminal of each of the L load capacitors 113 is connected to the voltage generation circuit, and a grounding terminal of each of the L load capacitors 113 is connected to ground;
in case that the i is equal to 1, the input signal is the initial command signal; and in case that the i is greater than 1 and less than or equal to N, the input signal is an output signal of the (i−1)-th delay sub-circuit.

It should be noted that in this implementation, each load capacitor 113 includes the first capacitor C1 and the second capacitor C2 as shown in FIG. 7. The load capacitor is embodied as the first capacitor C1 and the second capacitor C2, and other connection modes and functional descriptions are consistent with the above, which will not be repeated herein.

Figure 8:
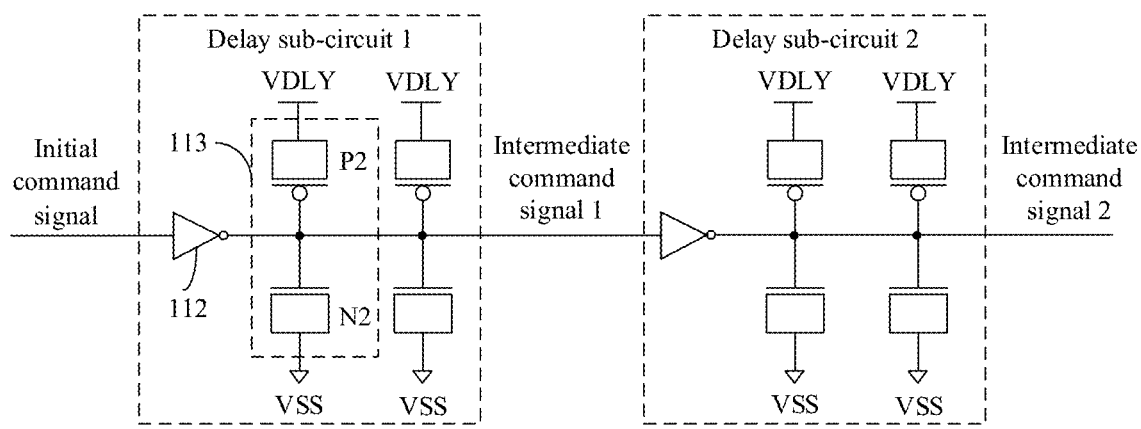
FIG. 8 is a schematic diagram of a specific structure of yet another delay sub-circuit according to an embodiment of the present disclosure.

Further, the first capacitor C1 and the second capacitor C2 may be realized by two MOS capacitors. Referring to FIG. 8, a schematic diagram of a specific structure of yet another delay sub-circuit according to an embodiment of the present disclosure is shown. As shown in FIG. 8, the first capacitor C1 may be realized by a MOS capacitor P2 (abbreviated as P2), and the second capacitor C2 may be realized by a MOS capacitor N2 (abbreviated as N2). Gates of the P2 and the N2 are connected; the source, drain and substrate of the P2 are all connected to the voltage generation circuit; and the source, drain and substrate of the N2 are all connected to the ground VSS. The connection mode and function of other parts are consistent with the above and will not be repeated here.

It should also be noted that FIG. 6, FIG. 7 and FIG. 8 only show exemplary implementations of the delay sub-circuit and the delay sub-circuit may be implemented in other modes, which will not be limited here.

Further, for the initial command signal, as shown in FIG. 4, the delay control circuit 10 may further include a buffer 14.

The buffer 14 is configured to receive an ECS command signal and generate the initial command signal based on the ECS command signal.

It should be noted that when the DRAM performs an ECS operation, especially an ECS operation based on a self-refresh command signal, and the initial command signal is an activate signal, the initial command signal may be generated based on the ECS command signal, so that the initial command signal may be obtained by the buffer 14 based on the ECS command signal, and the initial command signal may be further processed as described above to finally obtain the target command signal.

In some embodiments, the delay control circuit 10 may also include an ECS control circuit 15.

The ECS control circuit 15 is configured to generate the ECS command signal based on a self-refresh signal in the ECS operation mode.

It should be noted that, in the embodiment of the present disclosure, the initial command signal is obtained based on a non-clock-triggered operation. For the ECS operation mode, during performing the ECS operation generated based on the self-refresh signal, since there is no external clock signal, it can be regarded as the non-clock-triggered operation. As shown in FIG. 4, the ECS control circuit 15 is provided before the buffer 14 and is connected to the buffer 14. It should be noted that, the ECS control circuit 15 receives the self-refresh signal and generates the ECS command signal based on the self-refresh signal. It should be noted that, the ECS control circuit 15 may generate the ECS command signal based on the self-refresh signal at a certain interval to perform the ECS operation, and at other times, the ECS control circuit 15 normally performs the refresh operation based on the self-refresh signal, so as to avoid affecting the normal refresh operation of the memory.

The ECS control circuit 15 sends the generated ECS command signal to the buffer 14, and the buffer 14 obtains an initial command signal based on the ECS command signal. The initial command signal obtained based on the ECS command signal mainly refers to the activate signal. The buffer not only has the function of delay, but also has the function of enhancing the signal driving capability. Specifically, for the ECS command signal and the initial command signal, compared with the ECS command signal, the initial command signal not only has a time delay, but also has a stronger driving capability.

Figure 9:
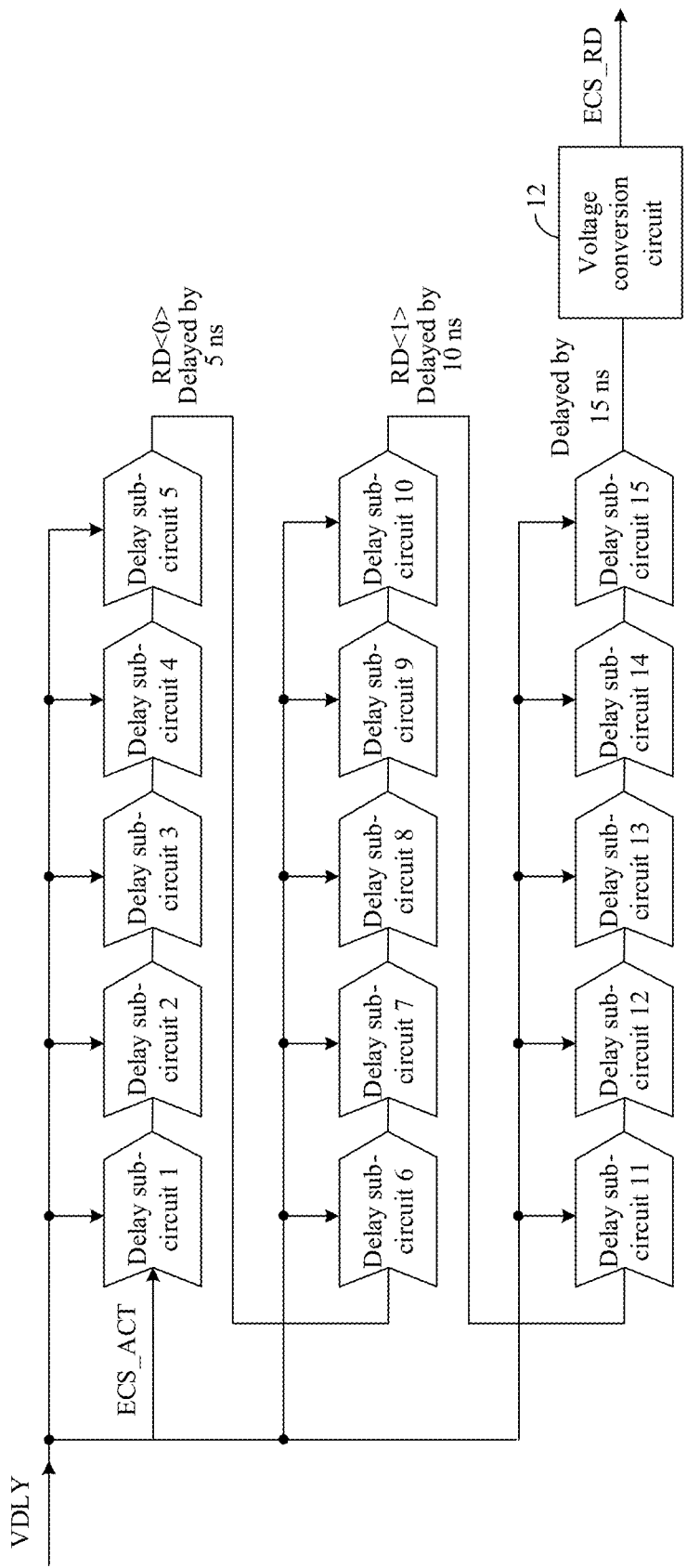
FIG. 9 is a schematic diagram of a specific structure of a delay control circuit according to an embodiment of the present disclosure.
Figure 10:
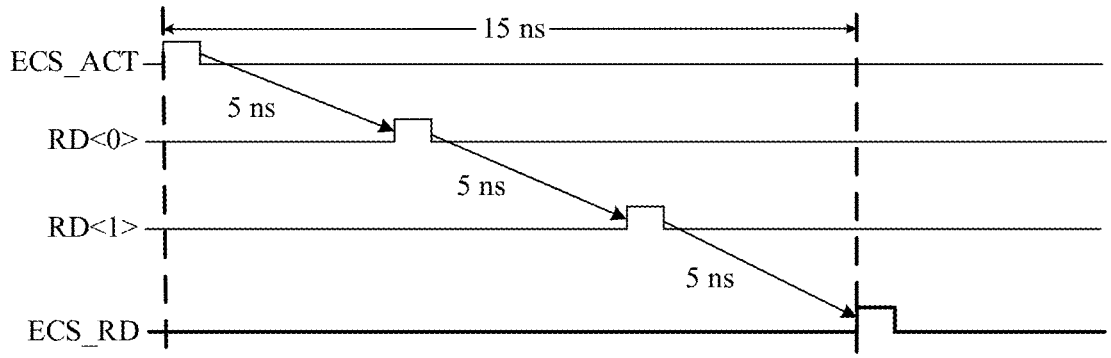
FIG. 10 is a schematic diagram of a signal timing according to an embodiment of the present disclosure.

To further describe the specific implementation of the delay control circuit 10, reference can be made to FIG. 9 which shows a schematic diagram of a specific structure of a delay control circuit 10 according to an embodiment of the present disclosure. As shown in FIG. 9, taking the delay from an ECS active command signal (ECS_ACT) to an ECS read signal (ECS_RD) during performing the ECS operation as an example, it is assumed that a time interval required by a preset timing condition is tRCD=15 ns. Taking delay time of a delay sub-circuit being 1 ns as an example, the ECS_ACT is used as an input signal, and a corresponding timing diagram is shown in FIG. 10. Referring to FIG. 9 and FIG. 10, a delay sub-circuit 1 to a delay sub-circuit 5 form the first stage delay sub-circuit, and an RD <0> output by the first stage delay sub-circuit is delayed by 5 ns relative to the ECS_ACT. A delay sub-circuit 6 to a delay sub-circuit 10 form the second stage delay sub-circuit, an RD <1> output by the second stage delay sub-circuit is delayed by 10 ns relative to the ECS_ACT. A delay sub-circuit 11 to a delay sub-circuit 15 form a third stage delay sub-circuit, the third stage delay sub-circuit outputs a target command signal, and the VDLY voltage is converted into the VDD voltage through a voltage conversion circuit 13, and the output ECS_RD is delayed by 15 ns relative to the ECS_ACT.

In short, through the technical solution of the embodiments of the present disclosure, the delay for the command signal is realized through the delay line, which is relatively flexible. On the premise that a delay duration of a delay sub-circuit is known to be t1, the delay time m requires m/t1 delay sub-circuits. At the same time, the power supply terminal of each delay sub-circuit needs to be connected to the VDLY voltage, the VDLY voltage is a fixed voltage after the silicon wafer test and adjustment process and will not change with the VDD. Meanwhile, it should be noted that the delay time of each delay sub-circuit in the delay line should not be too large, otherwise the transmission waveform will be affected. Finally, the required timing can be achieved without an external clock signal or without the need to know the clock cycle of the external clock signal. That is, the required timing can be achieved by using multiple delay sub-circuits in series in case that the total delay time is known.

The embodiments of the present disclosure provide a delay control circuit for solving the following problem: under Self_Refresh without external clock signal, or under other non-clock signal triggered operation, in order to meet the timing requirement of internally generated tRCD (and the timing requirement between other command signals), a delay circuit is adopted to delay the ECS_ACT to the ECS_RD by using a non-clock-triggered delay manner. At the same time, the embodiments of the present disclosure can also be applied to other manual ECS operations and automatic ECS operations and any scene of delay requirement in the absence of the external clock signal, and even if the external clock signal exists, the delay control circuit according to the embodiments of the present disclosure can be selected to realize the delay for the command signal in combination with the actual situation, so as to meet the timing requirement. In addition, a power supply terminal of the delay circuit is connected to the voltage generation circuit, and the voltage generation circuit is configured to provide the first voltage which is stable, and the time interval between the target command signal and the initial command signal meets a preset timing condition. In this way, firstly, in the absence of the external clock signal, the delay processing on the initial command signal can be realized through the non-clock-triggered manner of the delay sub-circuit, so as to meet the timing requirement between the self-generated command signals inside the memory. Secondly, the power supply terminals of the delay sub-circuits are all connected to a voltage generation circuit, and the stable VDLY voltage provided by the voltage generation circuit is used as the power supply to drive the delay sub-circuits, which ensures that the delay effect of the delay sub-circuits is not easily affected by external factors such as PVT. Thirdly, in order to prevent the normal signal function from being affected by the operating voltage of the target command signal being the VDLY voltage, the embodiments of the present disclosure further provide a voltage conversion circuit to finally convert the operating voltage of the target command signal back to the conventional VDD voltage, thereby ensuring the normal operation of the command signal.

Figure 11:
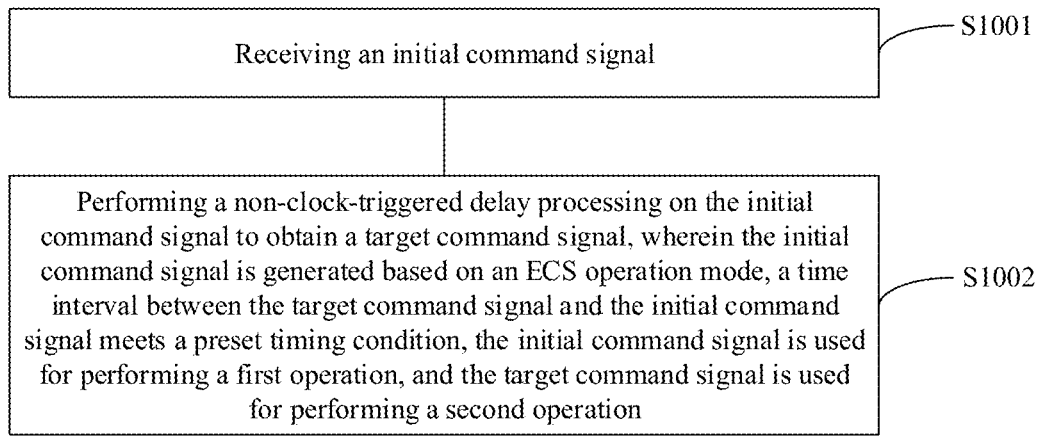
FIG. 11 is a schematic flowchart of a delay control method according to an embodiment of the present disclosure.

In yet another embodiment of the present disclosure, referring to FIG. 11, a schematic flowchart of a delay control method according to an embodiment of the present disclosure is shown. As shown in FIG. 11, the method may include following operations.

In S1001, an initial command signal is received.

In S1002, a non-clock-triggered delay processing on the initial command signal is performed to obtain a target command signal. The initial command signal is generated based on an ECS operation mode, a time interval between the target command signal and the initial command signal meets a preset timing condition, the initial command signal is used for performing a first operation, and the target command signal is used for performing a second operation.

In some embodiments, the method further includes that the first voltage which is stable is generated by a voltage generation circuit.

In some embodiments, the operation of generating the first voltage which is stable by a voltage generation circuit includes that: an initial voltage is received by a reference voltage circuit; a reference voltage is generated based on the initial voltage; and a voltage regulator processing on the reference voltage is performed by a voltage regulator circuit to generate the first voltage which is stable.

In some embodiments, the method may further include that the voltage conversion circuit performs a voltage conversion processing on the target command signal, to convert an operating voltage of the target command signal from the first voltage to a second voltage.

In some embodiments, the first voltage is a VDLY voltage and the second voltage is a VDD voltage.

In some embodiments, the method may further include a buffer receives an ECS command signal and generates the initial command signal based on the ECS command signal.

In some embodiments, the method may further include that the ECS command signal is generated based on a self-refresh command signal in the ECS operation mode.

In some embodiments, the initial command signal may include an activate signal and the target command signal may include a read signal. Alternatively, the initial command signal may include a read signal and the target command signal may include a write signal. Alternatively, the initial command signal may include a write signal and the target command signal may include a precharge signal. The activate signal is used for performing an activate operation, the read signal is used for performing a read operation, the write signal is used for performing a write operation, and the precharge signal is used for performing a precharge operation.

It should be noted that the delay control method according to the embodiment of the present disclosure can be applied to the delay control circuit 10 according to the foregoing embodiment, and details not disclosed by the embodiment of the present disclosure can be understood with reference to the description of the foregoing embodiment.

An embodiment of the present disclosure provides a delay control method, which can realize the delay processing for a command signal in a non-clock-triggered manner without an external clock signal, so that the time interval between a target command signal and an initial command signal meets a preset timing condition.

Figure 12:
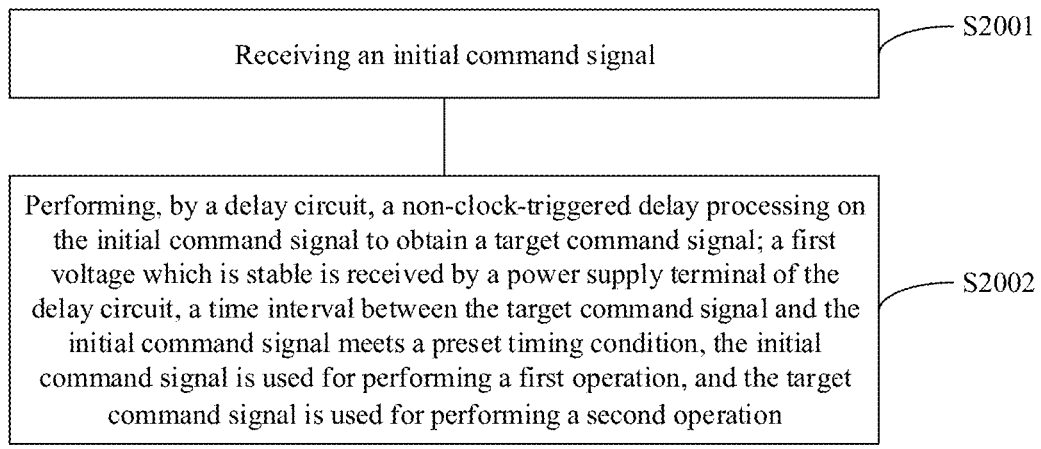
FIG. 12 is a schematic flowchart of another delay control method according to an embodiment of the present disclosure.

In yet another embodiment of the present disclosure, referring to FIG. 12, a schematic flowchart of another delay control method according to an embodiment of the present disclosure is shown. As shown in FIG. 12, the method may include following operations.

In S2001, an initial command signal is received.

In S2002, a non-clock-triggered delay processing on the initial command signal is performed by a delay circuit to obtain a target command signal. A power supply terminal of the delay circuit is used for receiving a first voltage which is stable, a time interval between the target command signal and the initial command signal meets a preset timing condition, the initial command signal is used for performing a first operation, and the target command signal is used for performing a second operation.

In some embodiments, the method further includes that a voltage generation circuit generates the first voltage which is stable.

In some embodiments, the operation that the voltage generation circuit generates the first voltage which is stable may include that: a reference voltage circuit receives an initial voltage and generates a reference voltage based on the initial voltage; and a voltage regulator circuit performs a voltage regulator processing on the reference voltage to generate the first voltage.

In some embodiments, the method may further include that a voltage conversion circuit performs a voltage conversion processing on the target command signal, to convert an operating voltage of the target command signal from the first voltage to a second voltage.

It should be noted that the delay control method according to an embodiment of the present disclosure can be applied to the delay control circuit 10 provided by the foregoing embodiment, and details not disclosed by the embodiment of the present disclosure can be understood with reference to the description of the foregoing embodiment.

An embodiment of the present disclosure provides a delay control method. Since a power supply terminal of a delay circuit receives the first voltage which is stable, the delay effect of the delay circuit is not easily affected by external factors such as PVT, so that delay time of a delay sub-circuit on a command signal is kept stable, and a time interval between a target command signal and an initial command signal is ensured to meet a preset timing condition.

Figure 13:
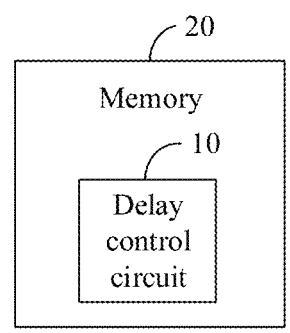
FIG. 13 is a schematic diagram of a composition structure of a memory according to an embodiment of the present disclosure.

In yet another embodiment of the present disclosure, referring to FIG. 13, a schematic diagram of a composition structure of a memory 20 according to an embodiment of the present disclosure is shown. As shown in FIG. 13, the memory 20 includes at least the delay control circuit 10 described in any of the foregoing embodiments.

In some embodiments, the memory 20 includes a DRAM.

It should be noted that the embodiments of the present disclosure relates to a timing-related circuit between command signals generated inside a memory in an integrated circuit design, in particular to a timing requirement between different command signals generated inside a DRAM chip. The technical solution of the embodiments of the present disclosure is different from the technical solution of adopting a shift register. For the technical solution of adopting the shift register. The shift register needs to use an external clock signal to delay the command signal, so as to meet the timing requirements under different frequencies, while the technical solution of the present disclosure adopts a delay line to delay the command signal. The technical solution of the present disclosure can be applied to a circuit for controlling timing from ACT to RD when performing an automatic ECS operation in the DRAM chip, but the technical solution of the present disclosure is not limited to this range, and other timing-related circuits between command signals generated internally can adopt this manner. That is to say, for other delay circuits with or without external clock signals, the delay processing between command signals can still be realized in this way.

In the embodiment of the present disclosure, the DRAM can not only conform to memory specifications such as DDR, DDR2, DDR3, DDR4, DDR5, DDR6, but also conform to memory specifications such as Low Power Double Data Rate (LPDDR), LPDDR2, LPDDR3, LPDDR4, LPDDR5, LPDDR6, which is not limited in the present disclosure.

In the embodiment of the present disclosure, since the memory 20 includes the delay control circuit described in the foregoing embodiment, the delay requirement between command signals can be realized without an external clock signal, and the delay duration is not easily affected by external factors such as PVT.

The foregoing is only an example embodiment of the present disclosure and is not intended to limit the scope of protection of the present disclosure.

It should be noted that, in the present disclosure, the terms "include", "comprise" or any other variation thereof are intended to encompass non-exclusive inclusion such that a process, a method, an article, or an apparatus including a set of elements includes not only the set of elements but also includes other elements not explicitly listed, or also includes elements inherent to the process, the method, the article, or the apparatus. In case that there are no further limitations, an element defined by the phrase "includes an . . . " does not preclude the existence of another identical element in the process, the method, the article or the apparatus in which the element is included.

The above serial numbers of the embodiments of the present disclosure are for description only and do not represent the advantages and disadvantages of the embodiments.

The methods disclosed in several method embodiments provided in the present disclosure can be arbitrarily combined without conflict to obtain new method embodiments.

The features disclosed in several product embodiments provided in the present disclosure can be arbitrarily combined without conflict to obtain new product embodiments.

The features disclosed in several method embodiments or circuit embodiments provided in the present disclosure can be arbitrarily combined without conflict to obtain new method embodiments or circuit embodiments.

The above are only specific implementations of the present disclosure, but the protection scope of the present disclosure is not limited thereto. Changes or substitutions that any person skilled in the art can easily think of within the technical scope disclosed in the present disclosure should be covered within the protection scope of the present disclosure. Therefore, the protection scope of the present disclosure should be subject to the protection scope of the claims.

INDUSTRIAL PRACTICALITY

According to the embodiments of the present disclosure, a non-clock-triggered delay processing on an initial command signal is performed by a delay circuit. Therefore, even if there is no external clock signal as a clock for signal delay during performing an ECS operation, the initial command signal can be delayed for a certain time in a non-clock-triggered manner to obtain a target command signal, so as to make a time interval between the target command signal and the initial command signal meet a preset timing condition. In addition, a power supply terminal of the delay circuit can also be connected to a voltage generation circuit, the voltage generation circuit can provide the first voltage which is stable as a driving voltage for the delay circuit, thereby improving the problem that the time delayed by the delay circuit is affected by external factors such as PVT, and further improving the performance of the memory.

The invention claimed is:

1. A delay control circuit, comprising:
a delay circuit, configured to receive an initial command signal, and to perform a non-clock-triggered delay processing on the initial command signal to obtain a target command signal, wherein the initial command signal is generated based on an Error Check and Scrub (ECS) operation mode, a time interval between the target command signal and the initial command signal meets a preset timing condition, the initial command signal is used for performing a first operation, and the target command signal is used for performing a second operation;
wherein the delay circuit comprises a delay line, and the delay line comprises at least one delay sub-circuit, and a power supply terminal of each of the at least one delay sub-circuit is configured to receive a first voltage.

2. The delay control circuit of claim 1, further comprising a voltage generation circuit, wherein
the voltage generation circuit is configured to generate the first voltage which is stable.

3. The delay control circuit of claim 2, wherein the voltage generation circuit comprises a reference voltage circuit and a voltage regulator circuit, and
the reference voltage circuit is configured to receive an initial voltage and generate a reference voltage based on the initial voltage; and
the voltage regulator circuit is configured to perform a voltage regulator processing on the reference voltage to generate the first voltage which is stable.

4. The delay control circuit of claim 2, further comprising a voltage conversion circuit, wherein
the voltage conversion circuit is configured to perform a voltage conversion processing on the target command signal, to convert an operating voltage of the target command signal from the first voltage to a second voltage.

5. The delay control circuit of claim 4, wherein the first voltage is a delay circuit voltage VDLY and the second voltage is an operating voltage VDD.

6. The delay control circuit of claim 2, wherein a number of the at least one delay sub-circuit is N, and the N is an integer greater than 0, and
in case that the N is equal to 1, an input terminal of the delay sub-circuit is configured to receive the initial command signal, and an output terminal of the delay sub-circuit is configured to output the target command signal; and
in case that the N is greater than 1, an input terminal of a first delay sub-circuit is configured to receive the initial command signal, an input terminal of an i-th delay sub-circuit is connected to an output terminal of an (i−1)-th delay sub-circuit, and an output terminal of an N-th delay sub-circuit is configured to output the target command signal, wherein the i is an integer greater than 1 and less than or equal to the N.

7. The delay control circuit of claim 6, wherein the delay sub-circuit comprises M inverters, and a power supply terminal of each of the M inverters is connected to the voltage generation circuit, and the M is an integer greater than 0, and
in case that the M is equal to 1, an input terminal of the inverter is configured to receive an input signal of the delay sub-circuit, and an output terminal of the inverter is configured to output an output signal of the delay sub-circuit; and in case that the M is greater than 1, an input terminal of a first inverter is configured to receive the input signal of the delay sub-circuit, an input terminal of a j-th inverter is connected to an output terminal of a (j−1)-th inverter, and an output terminal of an M-th inverter is configured to output the output signal of the delay sub-circuit, wherein the j is an integer greater than 1 and less than or equal to the M.

8. The delay control circuit of claim 6, wherein the i-th delay sub-circuit comprises an inverter and L load capacitors, and the L is an integer greater than 0, wherein an input terminal of the inverter is configured to receive an input signal; and an output terminal of the inverter is connected to the L load capacitors, a power supply terminal of each of the L load capacitors is connected to the voltage generation circuit, and a grounding terminal of each of the L load capacitors is connected to ground, and wherein in case that the i is equal to 1, the input signal is the initial command signal; and in case that the i is greater than 1 and less than or equal to the N, the input signal is an output signal of the (i−1)-th delay sub-circuit.

9. The delay control circuit of claim 1, wherein the delay sub-circuit is configured to delay the received input signal for a first duration and output the delayed signal; and wherein a product value of a number of the at least one delay sub-circuit and the first duration is equal to the time interval between the target command signal and the initial command signal.

10. The delay control circuit of claim 1, further comprising a buffer, wherein the buffer is configured to receive an ECS command signal and generate the initial command signal based on the ECS command signal.

11. The delay control circuit of claim 10, further comprising an ECS control circuit, wherein the ECS control circuit is configured to generate the ECS command signal based on a self-refresh signal in the ECS operation mode.

12. The delay control circuit of claim 1, wherein the initial command signal comprises an activate signal, and the target command signal comprises a read signal, or the initial command signal comprises a read signal, and the target command signal comprises a write signal, or the initial command signal comprises a write signal, and the target command signal comprises a precharge signal, wherein the activate signal is used for performing an activate operation, the read signal is used for performing a read operation, the write signal is used for performing a write operation, and the precharge signal is used for performing a precharge operation.

13. A delay control circuit, comprising:

a delay circuit, configured to receive an initial command signal, and to perform a non-clock-triggered delay processing on the initial command signal to obtain a target command signal, wherein a power supply terminal of the delay circuit is configured to receive a first voltage which is stable, a time interval between the target command signal and the initial command signal meets a preset timing condition, the initial command signal is used for performing a first operation, and the target command signal is used for performing a second operation; and a voltage generation circuit, configured to generate the first voltage which is stable.

14. The delay control circuit of claim 13, wherein the voltage generation circuit comprises a reference voltage circuit and a voltage regulator circuit, and the reference voltage circuit is configured to receive an initial voltage and generate a reference voltage based on the initial voltage; and the voltage regulator circuit is configured to perform a voltage regulator processing on the reference voltage to generate the first voltage which is stable.

15. The delay control circuit of claim 13, further comprising a voltage conversion circuit, wherein the voltage conversion circuit is configured to perform a voltage conversion processing on the target command signal, to covert an operating voltage of the target command signal from the first voltage to a second voltage.

16. A delay control method, comprising:

receiving an initial command signal; and performing a non-clock-triggered delay processing on the initial command signal to obtain a target command signal, wherein the initial command signal is generated based on an Error Check and Scrub (ECS) operation mode, a time interval between the target command signal and the initial command signal meets a preset timing condition, the initial command signal is used for performing a first operation, and the target command signal is used for performing a second operation;

wherein a power supply terminal of the delay circuit is used for receiving a first voltage which is stable, and the first voltage is generated by a voltage generation circuit.

17. A delay control circuit, comprising:

a delay circuit, configured to receive an initial command signal, and to perform a non-clock-triggered delay processing on the initial command signal to obtain a target command signal, wherein the initial command signal is generated based on an Error Check and Scrub (ECS) operation mode, a time interval between the target command signal and the initial command signal meets a preset timing condition, the initial command signal is used for performing a first operation, and the target command signal is used for performing a second operation;

wherein the initial command signal comprises an activate signal, and the target command signal comprises a read signal, or the initial command signal comprises a read signal, and the target command signal comprises a write signal, or the initial command signal comprises a write signal, and the target command signal comprises a precharge signal, wherein the activate signal is used for performing an activate operation, the read signal is used for performing a read operation, the write signal is used for performing a write operation, and the precharge signal is used for performing a precharge operation.

* * * * *